US008746702B1

(12) United States Patent
Benedict

(10) Patent No.: US 8,746,702 B1
(45) Date of Patent: Jun. 10, 2014

(54) IMPACT HAMMER TOOL BIT RETAINER INCORPORATING SHIELDING RING

(75) Inventor: Robert J. Benedict, Inverness, IL (US)

(73) Assignee: Ajax Tool Works, Inc., Franklin Park, IL (US)

( * ) Notice: Subject to any disclaimer, the term of this patent is extended or adjusted under 35 U.S.C. 154(b) by 1277 days.

(21) Appl. No.: 12/072,268

(22) Filed: Feb. 25, 2008

(51) Int. Cl.
*B23B 31/22* (2006.01)

(52) U.S. Cl.
USPC .............................. 279/75; 279/125; 279/157

(58) Field of Classification Search
USPC ......................... 279/75, 125, 157; 408/241 G
IPC ........................................................ B23B 31/22
See application file for complete search history.

(56) References Cited

U.S. PATENT DOCUMENTS

| | | | | | |
|---|---|---|---|---|---|
| 3,625,295 | A | | 12/1971 | Gunning | |
| 3,781,023 | A | | 12/1973 | Boyd | |
| 4,018,291 | A | | 4/1977 | Anderson | |
| 4,102,534 | A | | 7/1978 | Benedict et al. | |
| 4,174,113 | A | | 11/1979 | Eckman | |
| 4,231,581 | A | | 11/1980 | Benedict | |
| 4,502,824 | A | | 3/1985 | Dohse et al. | |
| 4,657,088 | A | | 4/1987 | Grossmann et al. | |
| 4,664,394 | A | * | 5/1987 | Theissig et al. | 277/641 |
| 4,692,073 | A | | 9/1987 | Martindell | |
| 4,802,798 | A | * | 2/1989 | Adamson | 408/112 |
| 4,848,980 | A | * | 7/1989 | Broussard | 408/67 |
| 5,409,243 | A | * | 4/1995 | Shadeck et al. | 279/157 |
| 5,437,524 | A | * | 8/1995 | Huang | 408/139 |
| 5,465,983 | A | * | 11/1995 | Owens et al. | 279/157 |
| 5,603,516 | A | | 2/1997 | Neumaier | |
| 5,971,403 | A | | 10/1999 | Yahagi et al. | |
| 6,053,675 | A | * | 4/2000 | Holland et al. | 408/239 R |
| 6,457,916 | B2 | | 10/2002 | Wienhold | |
| 6,474,656 | B1 | | 11/2002 | Thomas | |
| 6,554,290 | B2 | * | 4/2003 | Lin | 279/72 |
| 6,561,523 | B1 | | 5/2003 | Wienhold | |
| 6,726,222 | B2 | * | 4/2004 | Rohm et al. | 279/71 |
| 6,883,809 | B2 | * | 4/2005 | Rohm | 279/62 |
| 7,052,022 | B2 | * | 5/2006 | Chudy et al. | 279/143 |
| 7,234,782 | B2 | * | 6/2007 | Stehney | 299/104 |
| 7,270,379 | B2 | * | 9/2007 | Stehney | 299/104 |
| 7,404,696 | B2 | * | 7/2008 | Campbell | 408/16 |
| 2006/0163823 | A1 | * | 7/2006 | Shu | 279/75 |
| 2006/0186724 | A1 | * | 8/2006 | Stehney | 299/104 |
| 2007/0013224 | A1 | * | 1/2007 | Stehney | 299/104 |

* cited by examiner

*Primary Examiner* — Eric A Gates
*Assistant Examiner* — Bayan Salone
(74) *Attorney, Agent, or Firm* — George Pappas

(57) ABSTRACT

A retainer for holding a tool bit on an impact hammer including a shielding ring at the retainer distal end. The retainer includes an axially slidable sleeve whereby tool bits may be selectively exchanged on the retainer and whereby tool bits are secured in the retainer for use thereof. The sleeve is axially slidable toward the retainer distal end for placing the retainer in the locked or in-use position, and is axially slidable away from the distal end against the force of a spring for placing the retainer in the tool bit release position. The shielding ring extends radially beyond the axially slidable sleeve for preventing inadvertent axial movement of the sleeve to the release position by debris and/or objects which come in contact with the retainer distal end, and thereby aiding in the prevention of inadvertent release of the tool bit during use.

11 Claims, 4 Drawing Sheets

IMPACT HAMMER TOOL BIT RETAINER INCORPORATING SHIELDING RING

FIELD OF THE INVENTION

The present invention is directed to the field of chucks or retainers which are used on the end barrel of impact or reciprocating hammers for holding tools bits such as, chisels, scrapers, cutters, etc., thereon. More particularly, the present invention is directed to a retainer of an impact hammer wherein tool bits are selectively retained and exchanged.

DESCRIPTION OF RELATED AND PRIOR ART

Impact hammers are today commonly used for imparting reciprocating/percussion forces on tool bits such as chisels, scrapers, cutters and the like. Such impact hammers are typically pneumatic and/or rotary electric hammers. The hammers typically include an end barrel whereat the reciprocating/percussion force is provided. A tool chuck also known as a tool bit retainer is secured on the end barrel and is used for selectively holding tool bits thereon during use, and for selectively exchanging tool bits as may be desired.

Tool bit retainers typically include a tool bit retaining bore extending axially into the retainer body from the retainer body distal end. The opposite end of the retainer body is secured to the impact hammer barrel. A sleeve is provided circumscribing the retainer body and axially slidable thereon. A plurality of holes are provided through the retainer body and include annular seats whereby balls/bearings which are larger than the holes are provided and seat on the hole annular seat such that a portion of the ball exterior surface projects into the tool receiving bore. The sleeve includes camming surfaces for engaging the balls and, in one sleeve axial position toward the retainer distal end, a camming surface causes the balls to seat within their respective holes and project into the tool receiving bore whereby the balls engage the shank of the tool bit and whereby the tool bit is retained therein. By sliding the sleeve axially away from the retainer body distal end, a second camming surface allows the balls to travel radially outwardly exiting the tool receiving bore whereby tool bit shanks are freely insertable and/or removable from within the tool receiving bore for exchanging tool bits as may be desired.

A spring is provided circumscribing the retainer body and biasing the sleeve toward the retainer distal end in the axial position whereat a camming surface forces the balls radially inwardly into the tool receiving bore and whereby a tool bit previously received within the tool receiving bore is secured therein and prevented from being inadvertently released. Thus, the spring bias of the sleeve toward the distal end causes the retainer to be in a normally locked retaining position preventing the tool bit from exiting the tool receiving bore. For exchanging a tool bit, the operator must grasp the exterior surface of the sleeve and axially slide the sleeve against the spring bias and away from the distal end whereat the balls are allowed to travel radially outwardly for releasing and/or receiving tool bit shanks in the tool receiving bore as may be desired. Examples of tool retainer of this character are shown and described in Benedict et al, U.S. Pat. No. 4,102,534 and Chudy et al, U.S. Pat. No. 7,052,022.

SUMMARY OF THE INVENTION

A disadvantage recognized by the applicant in connection with prior tool bit retainers is that, during operation of the impact hammer, the retainer sleeve is sometimes inadvertently moved axially and placed in the release position thereby causing the inadvertent/unwanted release of the tool bit. Indeed, it is possible for the tool bit to be released and even thrown with significant force. It has been found that such inadvertent release of the tool bit quite often occurs as a result of debris or other objects traveling from the work area toward the tool bit retainer and/or in the event the work area is pierced causing the tool bit to travel completely through the hole and causing the distal end of the retainer to come in contact with the work surface. As can be appreciated, tight fitting work areas and environments such as, for example, emergency rescue environments, enhance the probability that debris and/or various objects may come in contact with the retainer sleeve, cause it to axially slide to the release position and inadvertently release the tool bit.

It is the object of the present invention to overcome the disadvantages and problems discovered to exist with prior tool bit retainers and the inadvertent release of tool bits. To this end, the object of the present invention is achieved by providing a shielding ring between the retainer tool distal end and the sleeve. The shielding ring extends radially a distance sufficient to effectively shield the sleeve during use by preventing the inadvertent axial movement of the sleeve by debris and/or objects that may come in contact with the retainer distal end. The shielding ring, thus, prevents movement of the sleeve toward the release position thereby significantly aiding in the prevention of inadvertent release of a tool bit from the tool receiving bore.

Preferably, the shielding ring outer surface diameter is larger than the sleeve outer surface which is typically grasped by the operator for axially sliding the sleeve away from the distal end. Yet more preferably, the shielding ring includes a through hole wherethrough the distal end of the tool receiving body is received and whereat the shielding ring is secured to the distal end with a pair of ring clips located axially on each side of the shielding ring. The ring clips are received in annular grooves of the tool retainer body thereby detachably securing the shielding sleeve therebetween.

In one form thereof, the present invention is an improved retainer for holding a tool bit on an impact hammer. The retainer includes a body portion having a tool receiving distal end and an opposite end for securement to an impact hammer. A tool receiving bore extends into the body portion from an opening at the distal end. A sleeve is provided circumscribing the retainer body. The sleeve is axially slidable on the body portion toward the tool receiving distal end to a first axial position whereat a tool bit shank received in the tool receiving bore is captured therein and prevented from exiting the bore. The sleeve is also axially slidable on the body portion toward the tool body opposite end to a second axial position whereat a tool bit shank may be inserted into and removed from the tool receiving bore. A spring is provided biasing the sleeve axially toward the tool distal end and toward the sleeve first position. The improvement is a shielding ring located between the tool receiving distal end and the sleeve. The shielding ring extends radially a distance sufficient to effectively shield the sleeve during use of the tool by preventing inadvertent axial movement of the sleeve by debris or objects which come in contact with the distal end and by preventing movement of the sleeve from the first position to the second position and thereby preventing inadvertent release of the tool bit from the tool receiving bore.

In another form thereof, the present invention is directed to a retainer for holding a tool bit on an impact hammer. The retainer includes a body portion having a tool receiving distal end and an opposite end. The opposite end is adapted for securement to an impact hammer. A tool receiving bore extends axially into the body portion from an opening at the distal end toward the opposite end. A sleeve is provided circumscribing the retainer body. The sleeve is axially slidable on the body portion toward the tool receiving distal end to a first axial position whereat a tool bit shank received in the tool receiving bore is captured therein and prevented from exiting the bore. The sleeve is also axially slidable on the body portion toward the tool body opposite end to a second axial position whereat a tool bit shank may be inserted into and removed from the tool receiving bore. A spring is provided biasing the sleeve axially toward the tool distal end and toward the sleeve first position. A shielding ring is provided between the tool receiving distal end and the sleeve. The shielding ring extends radially a distance sufficient to effectively shield the sleeve during use of the tool bit by preventing inadvertent axial movement of the sleeve by debris or objects which may come in contact with the distal end and preventing movement of the sleeve from the first position to the second position and thereby preventing inadvertent release of the tool bit from the tool receiving bore.

Preferably the retainer body portion includes a threaded bore extending axially into the body portion from the opposite end whereby the body portion may threadingly receive a threaded barrel end of an impact hammer and whereby the retainer body portion may be secured to an impact hammer. Alternatively, the retainer body portion may include an attachment bore extending axially into the body portion from the opposite end whereat an attachment sleeve is secured. The attachment sleeve is provided with a threaded bore adapted to threadingly engage a threaded barrel end of an impact hammer for thereby securing the body portion to an impact hammer.

The retainer further preferably includes a ball detent hole extending radially through the body portion from the tool receiving bore to the sleeve. A ball is provided and is captured between the body portion and the sleeve. The ball is larger than the detent hole and is sized whereby, when the ball is seated in the detent hole, an exterior surface of the ball projects into the tool receiving bore and provides interference with the tool bit shank for preventing removal of the tool bit from the tool receiving bore. The sleeve includes first and second camming surfaces selectively engaging the ball as the sleeve moves between the sleeve first and second axial positions. The first camming surface is located radially closer to the body portion than the second camming surface. The first camming surface corresponds with the sleeve first axial position whereby, when the sleeve is in its first axial position, the first camming surface engages the ball causing the ball to seat in the detent hole and causing the ball exterior surface to project into the tool receiving bore. The second camming surface corresponds with the sleeve second axial position whereby, when the sleeve is in its second axial position, the second camming surface allows the ball to become unseated from the detent hole causing the ball exterior surface to be removed from the tool receiving bore and thereby allowing a tool bit shank to be inserted into and removed from the tool receiving bore.

Preferably the retainer further includes a spring circumscribing the retainer body portion and extending between a raised annular shoulder on the body portion and the sleeve.

BRIEF DESCRIPTION OF THE DRAWINGS

The above mentioned and other features and objects of this invention, and the manner of obtaining them, will become more apparent and the invention itself will be better understood by reference to the following description of embodiments of the invention in conjunction with the accompanying drawings wherein.

Figure 1:
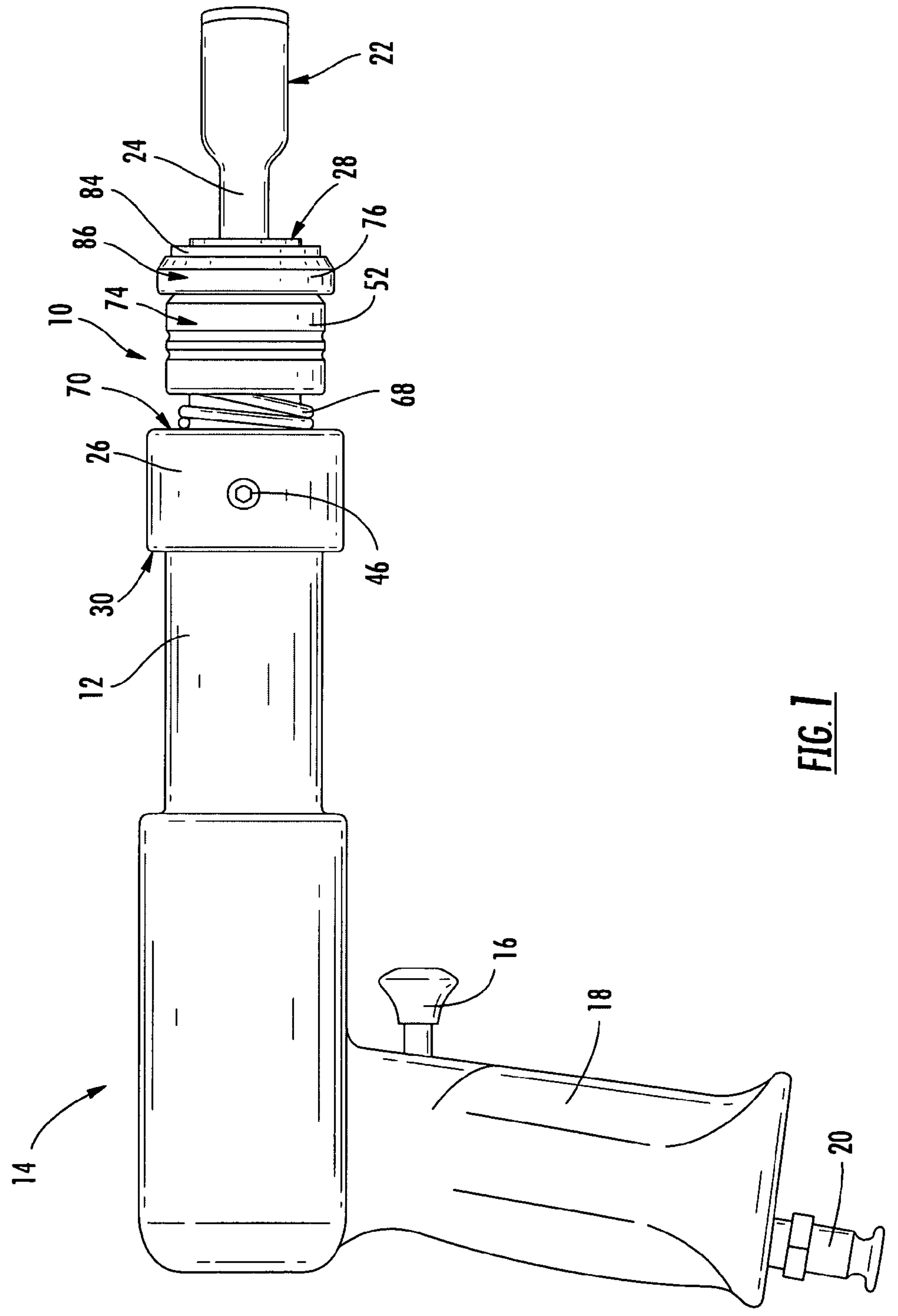
FIG. 1 is a side elevation view of a retainer for holding tool bits in accordance with the principles of the present invention and secured on a pneumatic impact hammer.

Corresponding reference characters indicate corresponding parts throughout these several views. Although the exemplification set out herein illustrate preferred embodiments of the invention, the embodiments disclosed herein are not intended to be exhaustive or to be construed as limiting the scope of the invention to the precise embodiments or forms disclosed.

DETAILED DESCRIPTION OF THE PREFERRED EMBODIMENT

Referring initially to FIG. 1, there is shown and generally designated by the numeral 10 a retainer or chuck secured on a barrel 12 of a pneumatic impact hammer 14.

Impact hammer 14 includes a trigger 16, handle 18 and an air hose connection port 20. An exemplary tool bit in the form of a chisel 22 having a tool bit shank 24 as shown is secured on the retainer 10 for use thereof. In operation, the impact hammer 14 provides a vibratory/percussion force through the retainer 10 to the tool bit 22 in a known and customary manner.

Figure 2:
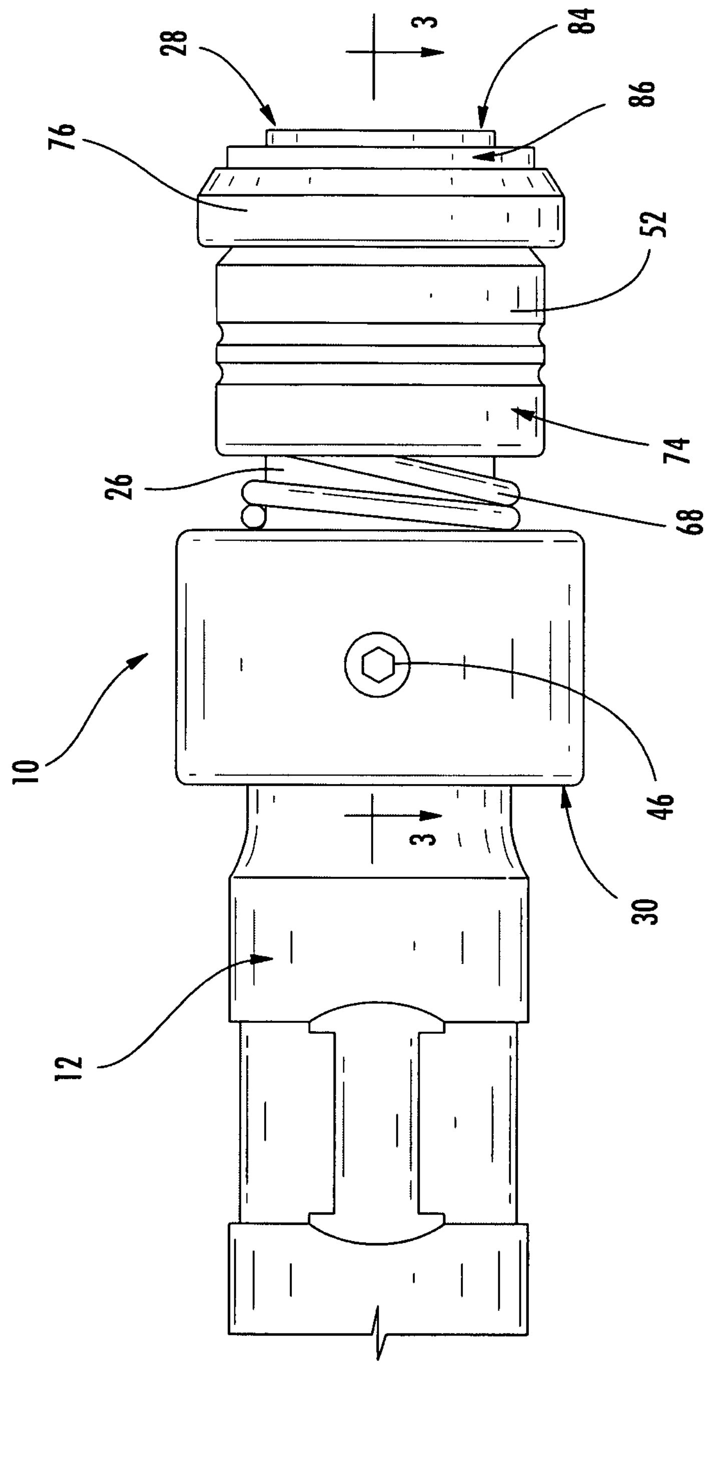
FIG. 2 is an enlarged view of the retainer shown in FIG. 1 secured on the barrel of an impact hammer.
Figure 3:
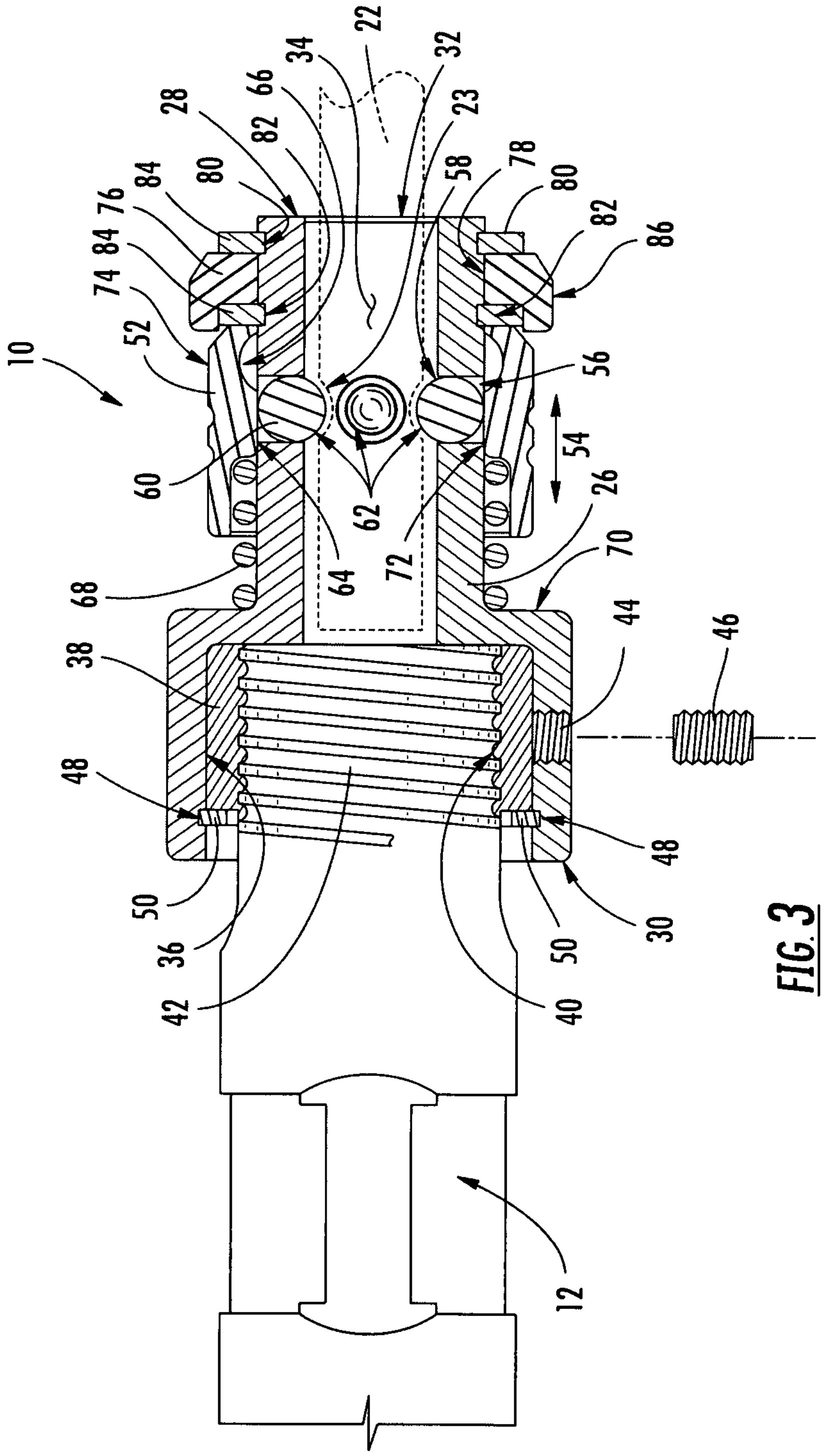
FIG. 3 is a cross-sectional view of the retainer shown in FIG. 2 taken along line 3-3 and wherein it is threadingly secured on an impact hammer barrel similar to FIG. 2.
Figures 4, 4A, 4B:
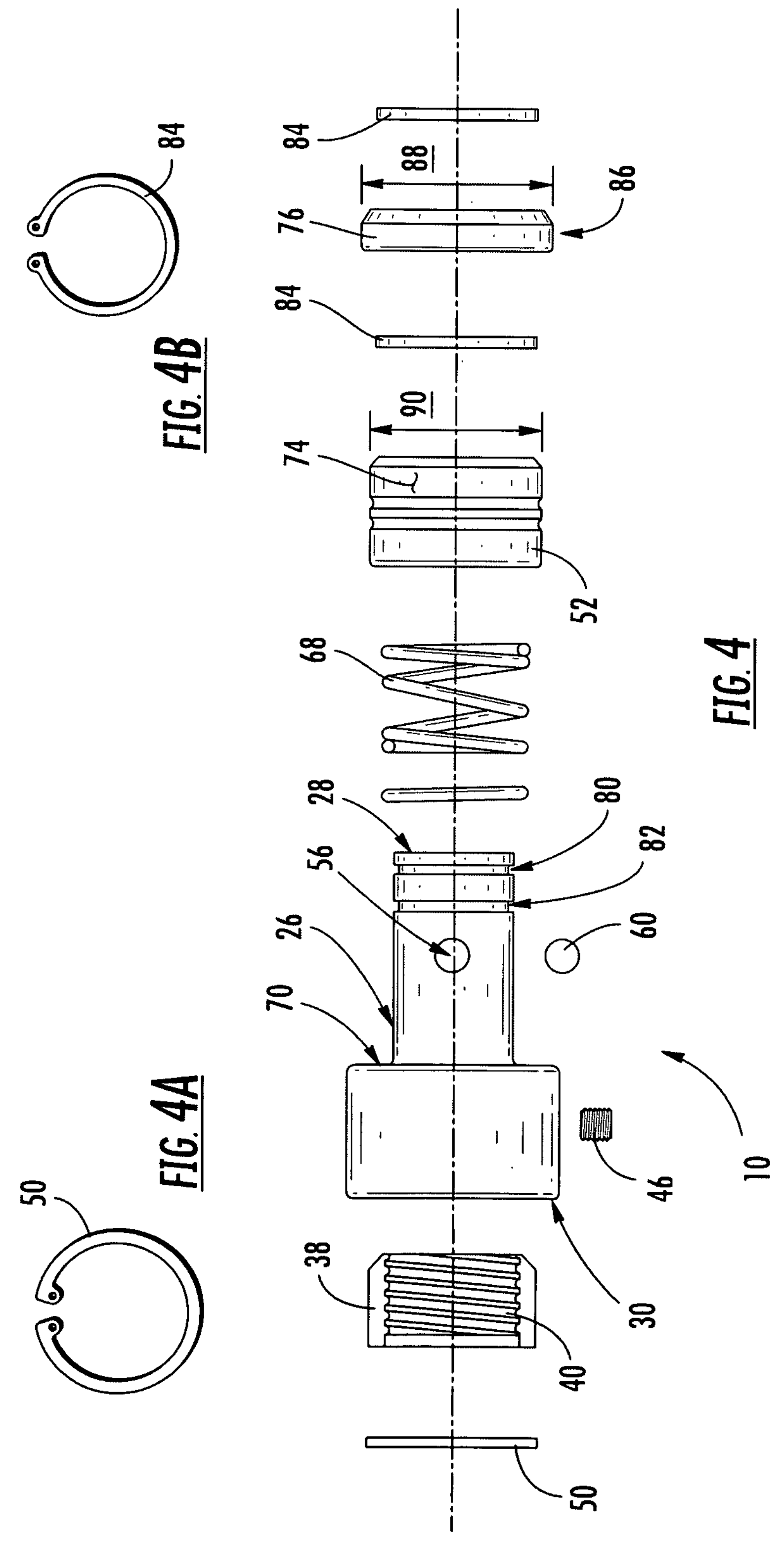
FIG. 4 is an exploded view of the retainer shown in FIG. 2.
FIGS. 4*a* and 4*b* are side elevation views of ring clips shown in FIG. 4.

Referring now more particularly to FIGS. 2-4, the preferred retainer, in accordance with the principles of the present invention, includes a body portion 26 having a distal end 28 and an opposite securement end 30. Body portion 26 includes an opening 32 at the distal end 28 leading to a tool receiving bore 34 which extends axially into the body portion 26. Tool receiving bore 34 is adapted to selectively receive and retain therein tool bits 22.

At the opposite or securement end 30, body portion 26 is provided with an attachment bore 36 which extends axially into the body portion 26. A nylon attachment sleeve 38 is adapted to be received within the attachment bore 36. Attachment sleeve 38 includes internal threads 40 adapted to threadingly mate with threads 42 which are provided at the terminal end of barrel 12. One or more radially extending threaded bores 44 are provided through the body portion 26 leading to the attachment bore 36. Allen screws 46 are threadingly received within the radially extending threaded bores 44 for engaging the attachment sleeve 38 and thereby affixing and preventing rotational movement of the attachment sleeve 38 relative to the body portion 26.

An annular groove 48 is provided on the surface of the attachment bore 36 extending radially into the body portion 26. An internal clip ring 50 is adapted to be received within the annular groove 48. As best seen in FIG. 3, the internal clip ring 50 received within the annular groove 48 seats against the axial end of the attachment sleeve 38 and thereby axially secures the attachment sleeve 38 within the attachment bore 36.

A tool bit locking sleeve 52 is provided and is received on the body portion 26 circumscribing the retainer body cylindrical portion which forms the tool receiving bore 34. Sleeve

52 is axially slidable on the body portion 26 as indicated by arrows 54. By axially sliding the sleeve 52 as indicated by arrows 54 the retainer 10, as more fully described hereinbelow, allows a tool bit shank to be selectively inserted into and removed from the tool receiving bore 34 and/or to be locked in the tool receiving bore 34.

One or more ball detent holes 56 are provided through the body portion 26 and extending from the tool receiving bore 34 radially outwardly to the exterior thereof and to the locking sleeve 52. Ball detent holes 56 are tapered increasing in size radially outwardly and/or are provided with a seat 58 near the surface of the tool receiving bore 34. Steel bearings, also sometimes referred to as balls, are received within the detent holes 56 and are captured therein between the seat 58 and the locking sleeve 52. Balls 60 are larger than the detent holes smallest diameter and/or are larger than the seats 58 such that, when a ball 60 is seated in the detent hole 56 its exterior surface 62 thereof projects into the tool receiving bore 34 and provides interference with the tool bit shank 24. As can be appreciated, with the exterior surface 62 of balls 60 extending within the tool receiving bore 34, the tool bit shank 24, shown in dash lines in FIG. 3, is prevented from removal thereof from the tool receiving bore 34.

As best seen in FIG. 3, the sleeve 52 is provided with a first annular camming surface 64 and a second annular camming surface 66 which selectively engage the balls 60 as the sleeve 52 is moved axially. More particularly, in the first sleeve position as shown in FIG. 3, the first annular camming surface 64 is engaged with the balls 60 and maintains the balls 60 within the detent holes 56 and with the ball exterior surface 62 extending into the tool receiving bore 34. Thus, in this first sleeve position, the balls 60 engage the annular surface 23 of tool bit shank 24 within the tool bit receiving bore 34 and prevent the removal thereof. In a second sleeve axial position, the sleeve 52 is axially moved toward the barrel 12 for aligning the second camming surface 66 radially over the balls 60. Because the second camming surface 66 is located radially further away from the retainer body portion 26, in the second sleeve axial position the balls 60 are allowed to become unseated from the detent hole seat 58 causing the balls 60 to travel radially outwardly until they engage the second camming surface 66 and whereby the ball exterior surface 62 is removed from the tool receiving bore 34. Thus, in this second sleeve axial position the tool bit shank 24 may freely be inserted into and removed from the tool receiving bore 34.

A spring 68 is provided circumscribing the retainer body portion 26 for biasing the sleeve 52 axially toward the tool distal end 28 and toward the sleeve first position as shown in FIG. 3. Spring 68 is located between the raised annular shoulder 70 on the retainer body 26 and the annular shoulder 72 on the sleeve 52. Accordingly, spring 68 biases or pushes the sleeve 52 toward the distal end 28 for placing the first camming surface 64 over the balls 60. For exchanging the tool bits an operator merely grasps the outer surface 74 of the sleeve 52 and slides the sleeve axially toward the shoulder 70 against the force of the spring 68. In this fashion, the sleeve 52 is placed in its second axial position whereat the second camming surface 66 is located radially over the balls 60 and whereat the balls 60 may travel radially outwardly for engaging the second camming surface 66 and exiting the tool receiving bore 34.

For preventing inadvertent axial movement of the sleeve 52 from its first axial position shown in FIG. 3 toward the second axial position rearwardly toward the shoulder 70, the retainer 10 in accordance with the principles of the present invention is provided with a shielding ring 76. Shielding ring 76 includes a through hole or bore 78 which is slightly larger than the retainer body portion 26 such that the distal end 28 of the tool body 26 is received therethrough. A pair of annular grooves 80, 82 are provided on the exterior surface of the retainer body portion 26 and are adapted to receive external type ring clips 84 therein. The ring clips 84 are located axially on each side of the shielding ring 76 within their respective annual grooves 80, 82 for thereby detachably securing the shielding ring 76 therebetween near the distal end 28 and in front of the sleeve 52.

The shielding ring has an outer surface 86 defined by or having an outer diameter 88. The outer surface 74 of the sleeve 52 is defined by or has an outer diameter 90. The shielding ring outer diameter 88 is advantageously larger than the outer diameter 90 of the sleeve 52. Most preferably, the shielding ring diameter 88 is at least 10% larger in diameter than the sleeve diameter 90. Accordingly, the shielding ring effectively shields the sleeve during use by preventing inadvertent axial movement of the sleeve 52 by debris or objects which may come in contact with the distal end 28 and effectively preventing movement of the sleeve 52 from the first or locked position shown in FIG. 3 to the second position axially rearwardly whereat the balls 60 may travel radially outwardly for releasing the tool bit 22 from the tool receiving bore 34.

While the invention has been described as having specific embodiments, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. In a retainer for holding a tool bit on an impact hammer, wherein the retainer includes a body portion having a tool receiving distal end and an opposite end for securement to an impact hammer, a tool receiving bore extending into the body portion from an opening at said distal end, a sleeve circumscribing said retainer body, wherein said sleeve is axially slidable on said body portion toward said tool receiving distal end to a first axial position whereat a tool bit shank received in said tool receiving bore is captured therein and prevented from exiting said bore and is axially slidable on said body portion toward said tool body opposite end to a second axial position whereat a tool bit shank may be inserted into and removed from said tool receiving bore, and a spring biasing said sleeve axially toward said tool distal end and toward said sleeve first position, an improvement comprising: a shielding ring between said tool receiving distal end and said sleeve, said shielding ring being incapable of releasing the tool bit and extending radially a distance sufficient to effectively shield said sleeve during use of the tool by preventing inadvertent axial movement of said sleeve by debris or objects which come in contact with said distal end and preventing movement of said sleeve from said first position to said second position and thereby preventing inadvertent release of the tool bit from said tool receiving bore;

wherein said shielding ring includes a through hole, said tool body portion axially extending through said shielding ring through hole and wherein said shielding ring is secured to said tool body portion near said distal end; and, further comprising ring clips located axially on each side of said shielding ring and detachably secured to said tool body portion, whereby said shielding ring is axially secured on said tool body portion between said ring clips.

2. The improvement of claim 1 wherein said tool body portion includes annular grooves wherein each of said ring clips are selectively received and are thereby axially detachably secured.

3. The improvement of claim 2 wherein said sleeve has an outer surface which may be grasped and whereby said sleeve may be axially moved against the spring bias to said sleeve second position, said sleeve outer surface being defined by an outer diameter, said shielding ring has an outer surface defined by an outer diameter, and wherein said shielding ring outer diameter is greater than said sleeve outer diameter.

4. The improvement of claim 3 wherein said shielding ring outer diameter is at least 10% greater than said sleeve outer diameter.

5. A retainer for holding a tool bit on an impact hammer, said retainer comprising:

a body portion having a tool receiving distal end and an opposite end, said opposite end adapted for securement to an impact hammer;

a tool receiving bore extending axially into said body portion from an opening at said distal end toward said opposite end;

a sleeve circumscribing said retainer body portion, wherein said sleeve is axially slidable on said body portion toward said tool receiving distal end to a first axial position whereat a tool bit shank received in said tool receiving bore is captured therein and prevented from exiting said bore and is axially slidable on said body portion toward said tool body opposite end to a second axial position whereat a tool bit shank may be inserted into and removed from said tool receiving bore;

a spring biasing said sleeve axially toward said tool distal end and toward said sleeve first position; and, a shielding ring between said tool receiving distal end and said sleeve, said shielding ring extending radially a distance sufficient to effectively shield said sleeve during use of the tool by preventing inadvertent axial movement of said sleeve by debris or objects which come in contact with said distal end and preventing movement of said sleeve from said first position to said second position and thereby preventing inadvertent release of the tool bit from said tool receiving bore; and, wherein said shielding ring includes a through hole, said tool body portion axially extending through said shielding ring through hole and wherein said shielding ring is secured to said tool body portion near said distal end; and, further comprising ring clips located axially on each side of said shielding ring and detachably secured to said tool body portion, whereby said shielding ring is axially secured on said tool body portion between said ring clips.

6. The retainer of claim 5 wherein said tool body portion includes annular grooves wherein each of said ring clips are selectively received and are thereby axially detachably secured.

7. The improvement of claim 5 wherein said shielding ring outer diameter is at least 10% greater than said sleeve outer diameter.

8. The retainer of claim 5 said body portion includes a threaded bore extending axially into said body portion from said opposite end, said threaded bore adapted to threadingly receive a threaded barrel end of an impact hammer, whereby said body portion may be secured to an impact hammer.

9. The retainer of claim 5 wherein said body portion includes an attachment bore extending axially into said body portion from said opposite end, an attachment sleeve secured in said attachment bore, said attachment sleeve having a threaded bore adapted to threadingly engage a threaded barrel end of an impact hammer, whereby said body portion may be secured to an impact hammer.

10. The retainer of claim 5 further comprising a ball detent hole extending radially through said body portion from said tool receiving bore to said sleeve, a ball captured between said body portion and said sleeve, wherein said ball is larger than said detent hole and is sized whereby, when said ball is seated in said detent hole, an exterior surface of said ball projects into said tool receiving bore and provides interference with the tool bit shank preventing removal of the tool bit from the tool receiving bore, said sleeve having a first and second camming surfaces selectively engaging said ball as said sleeve moves between said sleeve first and second axial positions, said first ramming surface located radially closer to said body portion than said second camming surface, said first ramming surface corresponding with said sleeve first axial position whereby, when said sleeve is in its first axial position, said first camming surface engages said ball causing said ball to seat in said detent hole and causing said ball exterior surface to project into said tool receiving bore, and said second camming surface corresponding with said sleeve second axial position whereby, when said sleeve is in its second axial position, said second ramming surface allows said ball to become unseated from said detent hole causing said ball exterior surface to be removed from said tool receiving bore and thereby allowing a tool bit shank to be inserted into and removed from said tool receiving bore.

11. The retainer of claim 5 wherein said spring circumscribes said body portion and extends between a raised annular shoulder on said body portion and said sleeve.

* * * * *

UNITED STATES PATENT AND TRADEMARK OFFICE

CERTIFICATE OF CORRECTION

PATENT NO. : 8,746,702 B1
APPLICATION NO. : 12/072268
DATED : June 10, 2014
INVENTOR(S) : Robert J. Benedict It is certified that error appears in the above-identified patent and that said Letters Patent is hereby corrected as shown below:

In the Claims

Column 8, line 33, change “ramming” to --camming--.

Column 8, line 35, change “ramming” to --camming--.

Column 8, line 42, change “ramming” to --camming--.

Signed and Sealed this
Twenty-sixth Day of August, 2014

Michelle K. Lee

Michelle K. Lee
*Deputy Director of the United States Patent and Trademark Office*